(12) United States Patent
Okamoto et al.

(10) Patent No.: US 7,847,492 B2
(45) Date of Patent: Dec. 7, 2010

(54) DISCHARGE LAMP LIGHTING APPARATUS AND PROJECTOR

(75) Inventors: Masashi Okamoto, Hyogo (JP); Takanori Samejima, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 542 days.

(21) Appl. No.: 11/984,138

(22) Filed: Nov. 14, 2007

(65) Prior Publication Data
US 2008/0111975 A1     May 15, 2008

(30) Foreign Application Priority Data
Nov. 14, 2006    (JP)   ............... 2006-307312

(51) Int. Cl.
    *H05B 37/02*   (2006.01)
(52) U.S. Cl. .................... 315/308; 315/209 R; 315/360
(58) Field of Classification Search ............. 315/209 R, 315/224–226, 291, 297, 307–308, 360
    See application file for complete search history.

(56) References Cited

U.S. PATENT DOCUMENTS

| 5,365,152 A | * | 11/1994 | Ozawa et al. ............... 315/291 |
| 5,485,061 A | * | 1/1996 | Ukita et al. ................. 315/307 |
| 5,917,558 A | | 6/1999 | Stanton |
| 6,520,648 B2 | | 2/2003 | Stark et al. |
| 6,914,393 B2 | * | 7/2005 | Nakagawa et al. .......... 315/246 |
| 7,084,585 B2 | * | 8/2006 | Yamamoto et al. .......... 315/291 |
| 7,439,690 B2 | * | 10/2008 | Fukuwa ....................... 315/308 |

FOREIGN PATENT DOCUMENTS

| JP | 8-505031 A | 5/1996 |
| JP | 2004-526992 A | 9/2004 |
| JP | 2005-353343 A | 12/2005 |
| WO | WO-95/11572 A | 4/1995 |
| WO | WO-02/063391 A | 8/2002 |

* cited by examiner

*Primary Examiner*—Douglas W Owens
*Assistant Examiner*—Tung X Le
(74) *Attorney, Agent, or Firm*—Rader, Fishman & Grauer PLLC

(57) ABSTRACT

In a discharge lamp lighting apparatus, increase modulation on lamp current with a pulse is carried out according to a modulation signal. At a start-up of the discharge lamp or immediately thereafter, the increase modulation is restrained, and in a lighting steady state of the discharge lamp, the restraining of the increase modulation is released, and wherein when the restraining of the increase modulation is released, in a transition period from immediately after the start-up of the discharge lamp to the lighting steady state, the restraining of increase modulation is gradually released.

9 Claims, 9 Drawing Sheets

FIG. 12
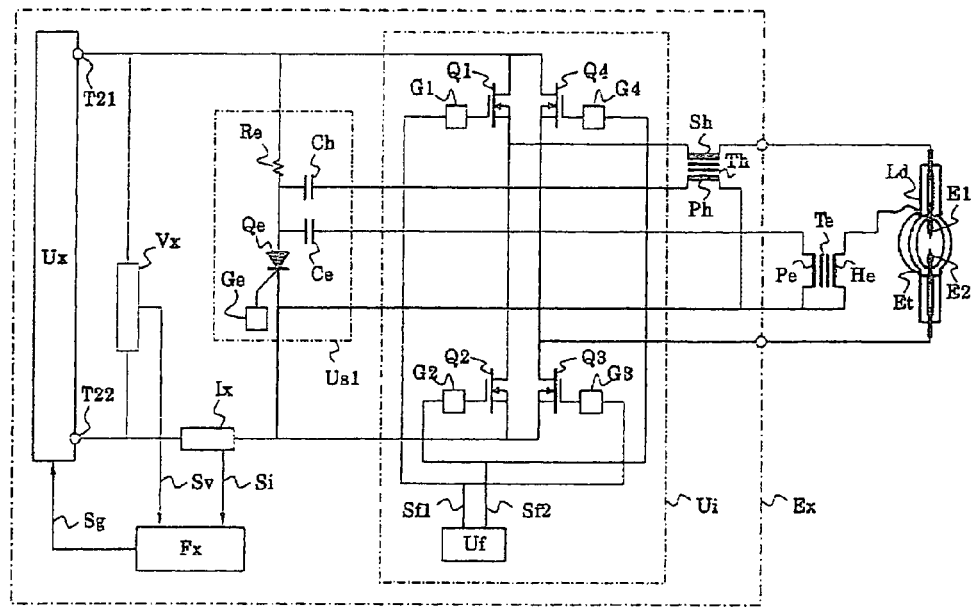
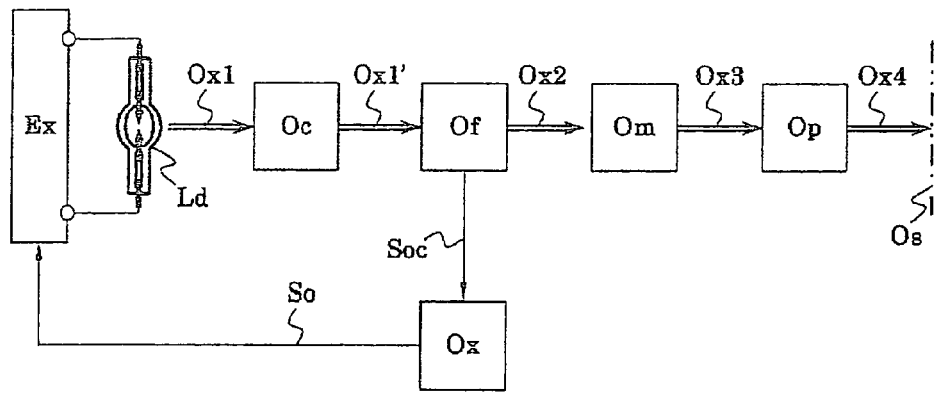
FIG. 13

DISCHARGE LAMP LIGHTING APPARATUS AND PROJECTOR

CROSS-REFERENCES TO RELATED APPLICATION

This application claims priority from Japanese Patent Application Serial No. 2006-307312 filed on Nov. 14, 2006, the contents of which are incorporated herein by reference in its entirety.

TECHNICAL FIELD

The present invention relates to a high-pressure discharge lamp used in a projector, and especially a discharge lamp lighting apparatus for turning on a high intensity discharge lamp, such as a high-pressure mercury lamp, a metal halide lamp, and a xenon lamp, and a projector using the discharge lamp lighting apparatus.

BACKGROUND

For example, in a projector as an optical device used for image display like a liquid crystal projector or a DLP (Trademark) projector, a high intensity discharge lamp (HID lamp) is used. In such a projector, by a dichroic prism etc., light is separated into the three primary colors of red, green, and blue, i.e., a space modulation element provided for each color generates an image of each of the three primary colors, and optical paths thereof are combined by a dichroic prism etc., so as to display a color image. In another known type of projector, light emitted from a light source is passed through a rotating filter (dynamic color filter) comprising a transmission color wheel having three primary color areas (R, G, and B), thereby sequentially generating light rays of the three primary colors. In synchronization with the generated light rays, the spatial modulation device is controlled so as to sequentially generate an image of each of the three primary colors in a time dividing manner, thereby displaying a color image.

Referring to FIG. 14 in which (a) shows change of lamp voltage (VL) and (b) shows change of lamp current (IL), a lighting operation of a discharge lamp lighting apparatus for a discharge lamp which is described above is explained briefly. First, in a state where voltage called a no-load open circuit voltage is impressed to the lamp at start-up (at time (to) or after in FIG. 14), high voltage etc. is impressed to electrodes, to generate dielectric breakdown in an electrical discharge space, and the state of discharge changes from glow discharge (at time (tg) or after in FIG. 14) to arc discharge (at time (ta) or after in FIG. 14), and finally, the discharge lamp lighting apparatus operates so that stable regular lighting may be realized.

The lamp discharge voltage which was low, i.e. about 10V, immediately after shifting from the glow discharge to the arc discharge, that is, immediately after the time (ta) of FIG. 14, goes up gradually in connection with a temperature rise, and is stabilized at constant voltage in a lighting steady state. Usually, such a discharge lamp lighting apparatus has a converter which adjusts an output of an input power supply for the lamp discharge voltage, in order to realize predetermined input electric power applied to the lamp thereby outputting required lamp current. Moreover, the lamp voltage, i.e., an output voltage of the converter, is detected. Based on information of the voltage detection, the target lamp current is determined according to a value of the quotient which is obtained by dividing, for example, target electric power by the detected voltage. Since, during a period when the lamp voltage immediately after shifting from the glow discharge to the arc discharge, is low, the target lamp current which is computed by dividing the target electric power by the detected voltage becomes very large (value), it cannot be realized. Instead of it, the maximum value ILmax of the lamp current is adopted as the target lamp current, so that when the lamp voltage goes up, and the calculation value obtained by dividing the target electric power by the detection voltage, becomes less than the maximum value Ilmax. Thus, the target lamp current is set as the calculation value.

As types of a driving method of such a discharge lamp, there are a direct-current drive method in which a lamp is turned on by a converter, and an alternating current driving method in which periodic polarity reversals (inversions) occur by providing an inverter further in the downstream side of the converter. In the case of the direct-current drive method, since the light flux from a lamp is like direct current, that is, it does not change with passage of time, basically, there is a big advantage that it can be similarly applied to both types of the above described projectors. On the other hand, in the case of the alternating current driving method, by using the flexibility of polarity-reversal frequency, that the direct-current drive method does not have, there is an advantage that growth or consumption of electrodes of the discharge lamp may be controlled. On the other hand, there are disadvantages resulting from existence of polarity reversals i.e., overshoot, instantaneous light-out at the time of polarity reversals etc. occurs thereby causing a bad influence on a display image etc.

On the other hand, when a dynamic color filter is used, in order to obtain high color-reproduction performance of a display image, it is important to adjust spectrum distribution of a light source lamp to the form of conversion to the color sequential light flux. In the case of the color wheel, it is possible to improve a color-reproduction performance or to carry out a desired color-reproduction performance by setting up angle distribution of R, G, and B areas of the color wheel (depending on circumstances, W (white) is added to the R, G, B), that is, by setting up the rate of a period per rotation during which light transmits through each color area, according to the spectrum of the lamp.

For example, when a R component runs short, it is effective to make the rate of a period during which light transmits through the R area longer than the rates of the other color periods. However, in the DLP system type projector, in order to obtain a desired color-reproduction performance by such a method, since the brightness for each color of each pixel of a display image is controlled by the duty cycle ratio, in process of each pixel of a space modulation element, there is a problem that it is difficult to carry out fine control of pixel tone, in the color component for which the rate of the period during which light currently transmits through the color area is reduced.

In order to solve such a problem, for example, in Japanese Laid Open Patent (Tokuhyo) No. H08-505031, it is proposed that, in an image projection apparatus, a light source drive control unit which changes an output power of a light source, synchronizing with the color of an optical beam outputted from a color change unit is provided. Similarly, in Japanese Laid Open Patent No. 2004-526992, a color-display apparatus in which electric power having two levels corresponding to colors is supplied, is proposed. Furthermore, in Japanese Laid Open Patent No. 2005-353343, without respect to the polarity-reversal timing of the lamp current which is driven in a manner of an alternating current, a projector which superimposes the pulse-current, synchronized with the color of a rotation filter, on lamp current is proposed.

In short, the common feature of such technology is to carry out modulation so that a pulse may be superimposed on lamp current corresponding to the filter color which appears in the projector. However, there is a problem which is not solved in these proposals.

Since lamp voltage of a high intensity discharge lamp is low immediately after start-up as described above, in order to form the light flux of a lamp fast and to make it shift to a steady state fast, it is necessary to pass the largest possible lamp current in the period immediately after the start-up so that heating of a lamp may be accelerated. However, the absolute value of the current which can be passed at this time has a maximum value ILmax, and if the current exceeding it is passed therethrough, even though it is pulse-current, consumption of lamp electrodes is caused. Therefore, during the period, under the condition where it does not exceed the maximum value ILmax of the lamp current, the average of lamp current increase so that the light flux of a lamp may be formed fast if a pulse is not superimposed rather than superimposing a pulse. This is because when a pulse is not superimposed, the lamp current can be passed continuously up to the full maximum value ILmax. On the other hand, in the case the pulse is superimposed, the lamp current is smaller than the maximum value ILmax on some level in periods other than the period when the pulse is superimposed.

Therefore, in the period immediately after start-up, the function for superimposing a pulse on lamp current is suppressed. That is, the function of a pulse superposition could not but be controlled to be released after waiting until a lamp is heated up so that lamp voltage goes up, and the lamp current becomes less than the maximum value ILmax on some level, so that it becomes in a state where it is certain that a peak current value will not exceed the maximum value ILmax even though a pulse is superimposed. However, in such a release of the suppression, since it is suddenly shifted from the state where the control is carried out to the state where the control is released, so that a viewer of the projection image of a projector perceives rapid change of the tone and the brightness of an image. Therefore, there is a big problem that it is very offensive to the eyes of the viewers. Moreover, in certain instances, there is a problem that it gives the viewer excessive uneasiness, by, for example, mixing up it with failure of machine.

In order to ease such problems, the control of a pulse superposition function is released as early as possible, so that the timing of the release is set at the time when the projection image of a projector is not much bright, that is, before a lamp is heated enough, whereby it is necessary to make it hard to see the rapid change of the image at the time of the release of the restraining. Therefore, since release of the control of the pulse superposition function is forced at time when the lamp voltage is not enough, there is almost no extra room to the maximum value ILmax of lamp current or depending on variation in a lamp, there is a problem in which the pulse is superposed on the lamp current so as to exceed the peak value. Thus, it is not ideal from a viewpoint of a lamp life.

SUMMARY

In a projector which has a discharge lamp lighting apparatus having a function for carrying out pulse-like increase modulation on current of a discharge lamp, the increase modulation is controlled (restrained, restricted or suppressed) immediately after start-up of the lamp. In case of the discharge lamp lighting apparatus which is operated so that the control of the increase modulation may be released in the lighting steady state of the lamp, the problem that a viewer perceives a rapid change of the tone and the brightness of a projection image of the projector is solved when restraining of the increase modulation is released.

A discharge lamp lighting apparatus, comprises a power supply circuit that supplies power to a discharge lamp, a lamp voltage detection circuit that detects lamp voltage of the discharge lamp so as to output a lamp voltage detection signal, a lamp current detection circuit that detects lamp current of the discharge lamp so as to output a lamp current detection signal, an electric power control circuit that updates a lamp current detection signal so that, according to the lamp voltage detection signal, a value of a load electric power value which is applied to the discharge lamp agrees with that of a predetermined target electric power value, an electric power supply capacity control circuit that controls the power supply circuit in a feed back manner so that a difference between the lamp current detection signal and the lamp current target signal becomes small, a lamp current modulation-circuit which is used for carrying out increase modulation on lamp current with a pulse according to a modulation signal, wherein at a start-up of the discharge lamp or immediately thereafter, the increase modulation is restrained, and in a lighting steady state of the discharge lamp, the restraining of the increase modulation is released, and wherein when the restraining of the increase modulation is released, in a transition period from immediately after the start-up of the discharge lamp to the lighting steady state, the restraining of increase modulation is gradually released.

In the discharge lamp lighting apparatus, according to the modulation signal, the lamp current modulation circuit may carry out the increase modulation on a gain of the lamp current detection signal to an output in the lamp current detection circuit.

In the discharge lam lighting apparatus according to the modulation signal, the lamp current modulation circuit may carry out the increase modulation on a gain of the lamp current target signal to an output in the electric power control circuit.

In the discharge lamp lighting apparatus, the increase modulation may be carried out by restraining a degree at which the gain is made small.

In the discharge lamp lighting apparatus, the increase modulation may be carried out by restraining a degree at which the gain is made large.

In the discharge lamp lighting apparatus, the increase modulation may be restrained by controlling he lamp current so as not to exceed a predetermined value.

In the discharge lamp lighting apparatus, a first signal corresponding to a lamp current value when the increase modulation is not carried out and a second signal corresponding to the lamp current when the increase modulation in which the second signal is assured so as not to exceed a predetermined value is carried out, may be generated, and one of the first and second signals may be selected so that a level of the lamp current in case the increase modulation is not carried out and that of the lamp current in case the increase modulation is carried out, are determined.

Further, in a projector, a display image is projected by using light flux which is generated by the discharge lamp. The discharge lamp may be started up by the above-mentioned discharge lamp lighting apparatus.

Moreover, in the projector, the light from the discharge lamp may be converted to color sequential light flux, and the image may be projected so as to display by using the color sequential light flux, and the modulation signal may be generated depending on a particular color of the color sequential light flax.

Even in a projector which has a discharge lamp lighting apparatus which has a function for carrying out pulse-like increase modulation on the current of a discharge lamp, and which is operated so that the increase modulation is restrained immediately after start-up of a lamp, and the restraining of the increase modulation may be released in the lighting steady state of the lamp, the restraining of the increase modulation is gradually released, during a period when the state shifts to a lighting steady state from immediately after start-up of the discharge lamp (Ld), so that even when the restraining of the increase modulation is released, the discharge lamp lighting apparatus and the projector can solve the problem that the viewer perceives a rapid change of the tone and the brightness of a projection image of the projector.

BRIEF DESCRIPTION OF DRAWINGS

Other features and advantages of the present discharge lamp lighting apparatus and a projector will be apparent from the ensuing description, taken in conjunction with the accompanying drawings, in which:

FIG. 12 is a schematic diagram showing part of an embodiment of a discharge lamp lighting apparatus;

FIG. 13 is a schematic block diagram showing part of an embodiment of a discharge lamp lighting apparatus.

DETAILED DESCRIPTION

Figure 1:
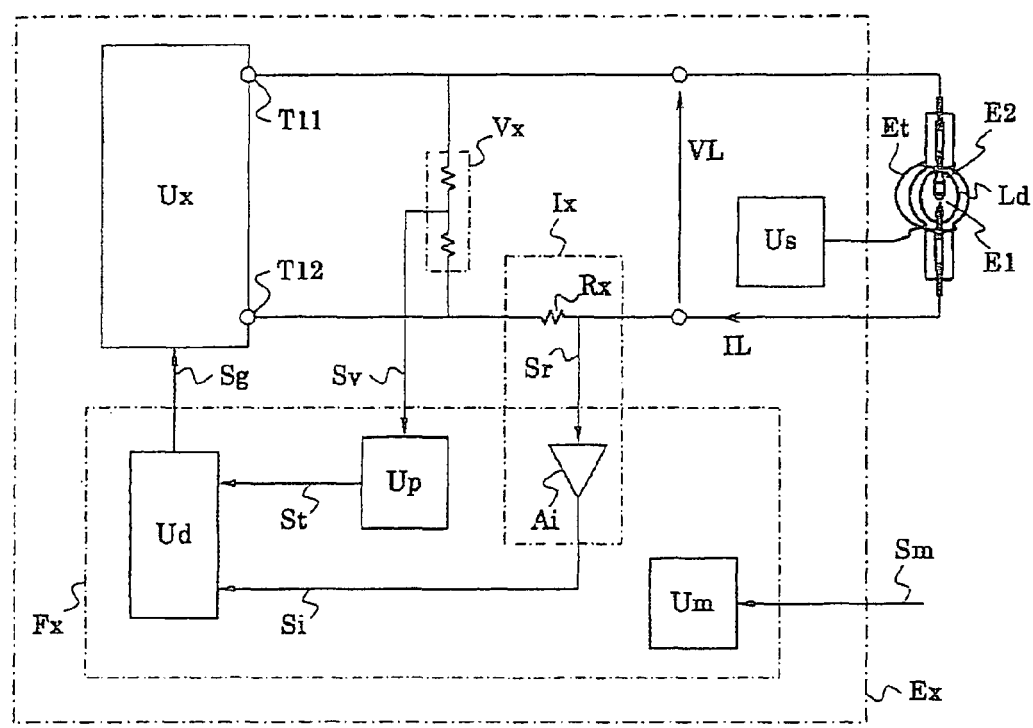
FIG. 1 is a schematic block diagram showing an embodiment of a discharge lamp lighting apparatus.

First, an embodiment of a discharge lamp lighting apparatus will be described below, referring to a block diagrams shown in FIG. 1. An electric supply circuit (Ux) is connected to electrodes (E1, E2) used for main discharge of a discharge lamp (Ld) so that electric power may be supplied to the discharge lamp (Ld). A starter (Us) for initiation of discharge is connected to the discharge lamp (Ld).

In the figure, an example of an external trigger type discharge lamp in which high voltage is applied to an auxiliary electrode (Et) provided outside a container of the discharge lamp (Ld) is shown. The trigger type of the discharge lamp is not significant to the essence of the embodiment. A trigger method in which high voltage pulse is impressed by a high-voltage pulse generating circuit connected in series to the electrodes (E1, E2) for main discharge, or a method in which high voltage generated by resonance is impressed thereto, may be used. Moreover, although this figure shows a direct-current drive type discharge lamp lighting apparatus, as described below, an alternating current driving type discharge lamp lighting apparatus, in which an inverter is provided between the power supply circuit (Ux) and the discharge lamp (Ld), may be used. The type of the driving method, that is, a direct-current drive method or an alternating current driving method is unrelated to the essence of the embodiment.

Output current (IL) of the electric supply circuit (Ux) i.e., lamp current, is detected by a lamp current detection unit (Ix), whereby a lamp current correlation signal (Si) is generated. The lamp current correlation signal (Si) and a lamp current target signal (St) which is a control target value of the signal (Si) are inputted into an electric supply capacity control circuit (Ud), and these two signals are compared with each other in the electric supply capacity control circuit (Ud). A feedback control of an output of a gate driving signal (Sg) to the electric supply circuit (Ux) is carried out so that the lamp current correlation signal (Si) and the lamp current target signal (St) are in agreement, in which the lamp current (IL) may increase when the value of the lamp current correlation signal (Si) is smaller than that of the lamp current target signal (St), and so that the lamp current (IL) may decrease when the value of the lamp current correlation signal (Si) is larger than the lamp current target signal (St).

On the other hand, the output voltage of the electric supply circuit (Ux), i.e., lamp voltage (VL), is detected by a lamp voltage detection unit (Vx), so that a lamp voltage detection signal (Sv) is generated, and inputted into the electric power control circuit (Up). The electric power control circuit (Up) has a function for updating the lamp current target signal (St) so that a load electric power value (PL) applied to the discharge lamp (Ld) may turn into a pre-determined target electric power value (PT) by using the lamp voltage detection signal (Sv). In addition, the lamp current detection circuit (Ix) can be easily realized by using, for example, a shunt resistor (RX), and by adding a lamp current detection signal converter (Ai) comprising an amplifier or attenuator if necessary. The lamp voltage detection unit (Vx) can be realized easily by using, for example, a voltage dividing resistors. In such a basic structure, it is possible to initiate the discharge lamp (Ld) and maintain discharge by a predetermined power.

A modulation signal (Sm) is inputted into a lamp current modulation circuit (Um), so that an increase modulation in which the lamp current (IL) is increased in a pulse-like manner can be carried out. However, at the time of start-up of the lamp, or immediately after that, the increase modulation is restrained and the increase of the lamp current in the pulse like manner is not performed at all, or the quantity of an increase is controlled low. And time passes from the start-up of the lamp, and in the suitable time in the middle of the shifting process to a lighting steady state, the controlled increase modulation may be released gradually. Thus, in the discharge lamp lighting apparatus of the embodiment, since the controlled increase modulation is released gradually, i.e., slowly, even if there is a difference between tone and brightness of the projection image of the projector in the state where increase modulation is controlled, and that in the state where the release of the increase modulation suppression is carried out, the viewers of a projection image do not notice that there was such change, or do not think that it is offensive to their eyes.

For example, when in the projector which has a color wheel having four colors of R, G, B, and W, a consciousness examination was concluded by using a discharge lamp lighting apparatus, which was configured so that the increase modulation in which only the lamp current of the period corresponding to R was increased by 25% was carried out. In the experiment, persons being tested did not notice any change, in case where a period from the start of release of the restraining of modulation to an end thereof was about 2 or more seconds in an animation, and where it was more than about 3 or more seconds in a still picture. Persons being tested did not feel offensive to their eyes due to the change in case where it was about 0.8 seconds or more in an animation, or where it was about 1 second or more in a still picture.

Therefore, even when the conditions of a color on which the increase modulation is carried or the conditions of the amount of increase differ depending on cases, the set value of the period from the start of release of the restraining of the increase modulation to an end thereof, is preferably greater than 3 seconds or more, and it is sufficient if the set value is 5 to 10 seconds. In order to merely reduce offensive feeling to the eyes, the value may be set to 1 second or more.

Here, the modulation signal (Sm) is generated by an image-processing section of a projector main body which collaborates with this discharge lamp lighting apparatus. Or, for example, the modulation signal (Sm) may be generated by the discharge lamp lighting apparatus itself based on a modulation switching timing signal sent to this discharge lamp lighting apparatus, which is generated in the image-processing section of the projector main body, based on an operation of a dynamic color filter. The origin of generation of the modulation signal (Sm) is not the essence of the present invention. Moreover, the modulation signal (Sm) may be a 1-bit binary signal which has high and low levels, multiple bit digital signal with gradation, or an analog signal, as long as the lamp current modulation circuit (Um) may be suitably provided in each case. The form of the modulation signal (Sm) is not the essence of the present invention. In addition, such a modulation signal (Sm), may include a form which consists of a multi-bit digital signal portion or an analog signal portion which defines the rate at which lamp current is increased by the increase modulation, and a 1-bit binary signal portion which defines whether or not modulation is carried out.

In the figure, an example of an external trigger type discharge lamp in which high voltage is applied to an auxiliary electrode (Et) provided in the exterior of a container of the discharge lamp (Ld) is shown. The trigger type of the discharge lamp is not the essence of the embodiment.

Figure 2:
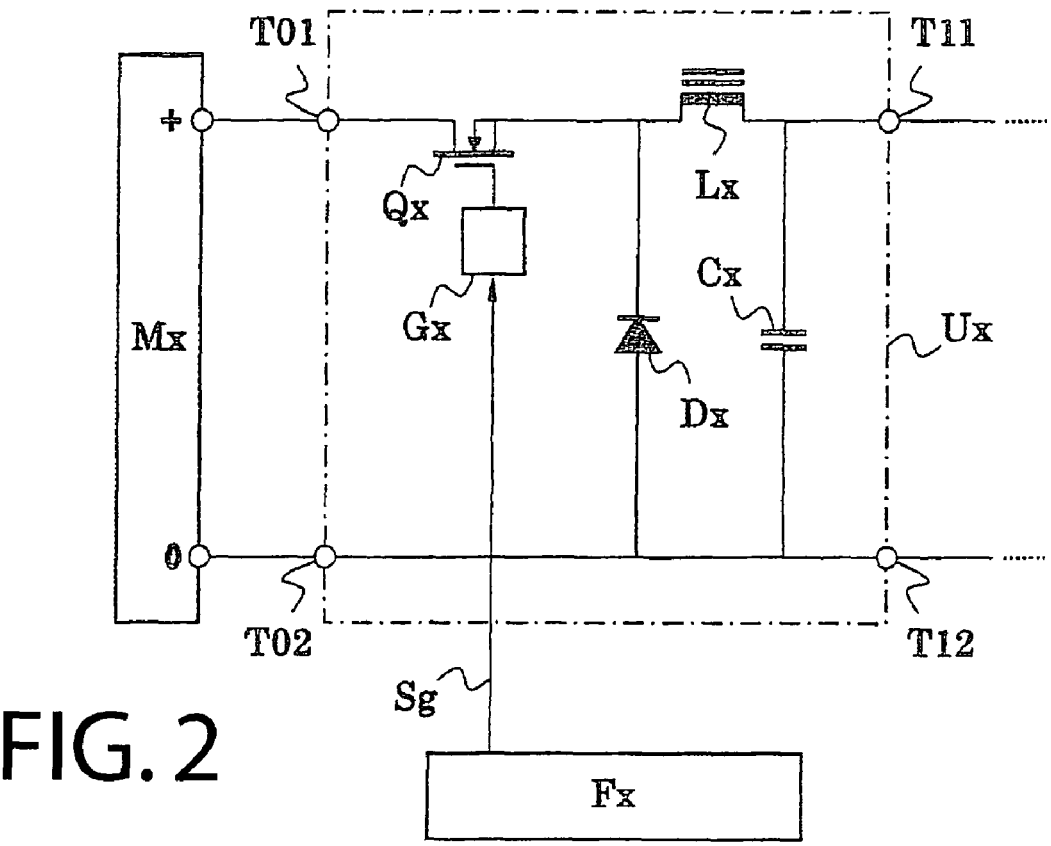
FIG. 2 is a schematic diagram showing part of an embodiment of a discharge lamp lighting apparatus.

FIG. 2 shows an example of the power supply circuit (Ux) which can be used with the discharge lamp lighting apparatus of the embodiment. The power supply circuit (Ux) which is mainly made up of a step down chopper circuit operates in response to supply of voltage from a DC power source (Mx), such as a PFC, and adjusts the amount of electric supply to the discharge lamp (Ld). In the power supply circuit (Ux), current from the DC power source (Mx) is turned on and off by a switching element (Qx), such as an FET, and a smoothing capacitor (Cx) is charged through a choke coil (Lx), so that the voltage is impressed to the discharge lamp (Ld) (FIG. 1), whereby current can be passed through the discharge lamp (Ld).

In addition, when the switching element (Qx) is in an ON state, by the current which flows through the switching element (Qx), the smoothing capacitor (Cx) is directly changed and current is supplied to the discharge lamp (Ld), which is load. Energy is stored in the choke coil (Lx) in form of magnetic flux. During a period when the switching element (Qx) is in an OFF state, by energy stored in the choke coil (Lx) in the form of magnetic flux through flywheel diode (Dx), the smoothing capacitor (Cx) is charged and current is supplied to discharge lamp (Ld).

In the step down chopper type power supply circuit (Ux), the amount of electric supply to the discharge lamp can be adjusted by the ratio of the period of an ON state of the switching element (Qx) to the operation cycle of the switching element (Qx), that is, a duty cycle ratio. Here, the gate driving signal (Sg) which has a certain duty cycle ratio is generated by an electric supply control circuit (Fx), and turning on and off the current from the DC power source (Mx) is controlled by controlling the gate terminal of the switching element (Qx) through a gate driving circuit (Gx).

In addition, although the step down chopper circuit is shown as the power supply circuit (Ux), a converter for converting input electric power into voltage/current suitable for supplying electric power to the discharge lamp, for example, a step up chopper circuit etc. can be used. The form of a power supply circuit is not the essence of the embodiment.

Figure 3:
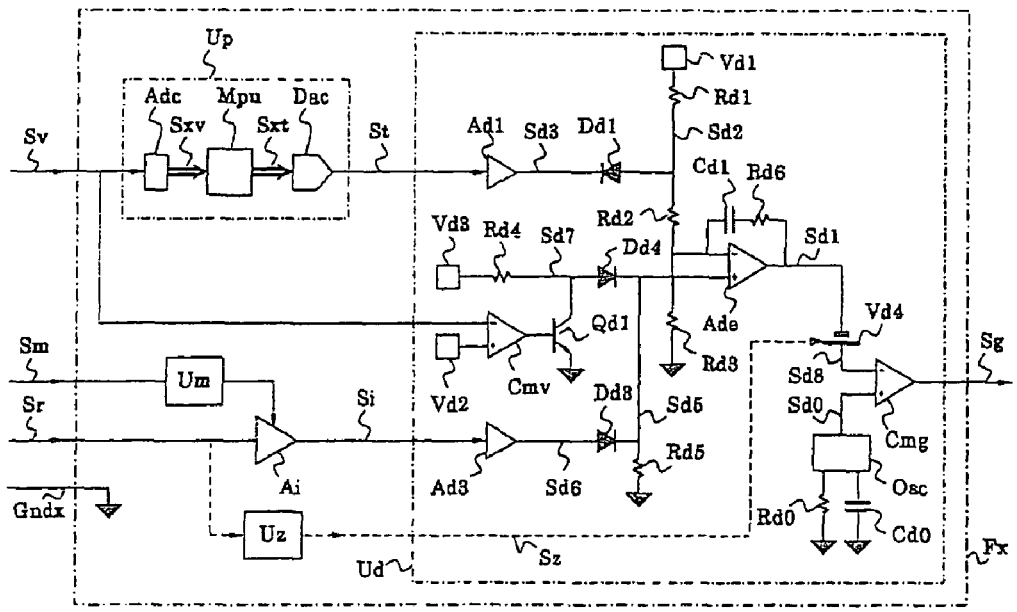
FIG. 3 is a schematic diagram showing part of an embodiment of a discharge lamp lighting apparatus.

Next, one of the forms for carrying out the embodiment is explained referring to FIG. 3 which is a schematic view of the structure of the electric supply control circuit (Fx). The lamp voltage detection signal (Sv) is inputted into an AD converter (Adc) in the electric power control circuit (Up), so as to be converted into digital lamp voltage data (Sxv) which has a suitable number of digits, and is inputted into a microprocessor unit (Mpu). Here, the microprocessor unit (Mpu) contains an IO controller for inputs and outputs of a CPU, a program memory, a data memory, a clock pulse generating circuit, a time counter, and a digital signal etc.

The microprocessor unit (Mpu) generates a chopper capacity control target data (Sxt) for the electric supply capacity control circuit (Ud) which is described later, based on condition judgments according to calculation referred to the lamp voltage data (Sxv), and the state of the system at the time. For example, the value of the lamp current (IL) for attaining rated power is calculated by dividing a constant corresponding to the rated power by the lamp voltage data (Sxv). The chopper capacity control target data (Sxt) is generated as data corresponding to this value. However, in order to generate it immediately after start-up, on the conditions on which the calculation value obtained by the division is greater than the value corresponding to the maximum value ILmax of lamp current (IL), the value which corresponds to the maximum value ILmax is set up as the chopper capacity control target data (Sxt), instead of the calculation value. The chopper capacity control target data (Sxt) is changed into a lamp current target signal (St) in form of analog by the digital-to-analog converter (Dac), and is inputted into the power supply capacity control circuit (Ud).

In the electric supply capacity control circuit (Ud), the lamp current target signal (St) is sent through an amplifier or a buffer (Ad1) and a diode (Dd1) which are provided if needed, to one end of a pull-up resistor (Rd1), thereby generating a chopper drive target signal (Sd2). In addition, the other end of the pull-up resistor (Rd1) is connected to a reference voltage source (Vd1) having suitable voltage.

On the other hand, a lamp current modulation circuit (Um) is connected to a lamp current detection signal converter (Ai) for converting (amplification or attenuation) the original lamp current detection signal (Sr) from the shunt resistor (Rx) shown in FIG. 1. According to the modulation signal (Sm), modulation is carried out on the gain in the lamp current detection signal converter (Ai), so that the lamp current detection signal (Si) is generated. This signal is inputted to one end of a pull down resistor (Rd5) whose other end is connected to the ground (Gndx), through an amplifier, or a buffer (Ad3)

and a diode (Dd3) which are provided if needed, so that a controlled object signal (Sd5) may be generated.

Furthermore, the lamp voltage detection signal (Sv) is compared with voltage of a reference voltage source (Vd2) which has voltage corresponding to no-load open circuit voltage, by a comparator (Cmv). If the lamp voltage detection signal (Sv) is higher than the non-load open circuit voltage, a transistor (Qd1) becomes an OFF state or an activity state, and the level of the controlled object signal (Sd5) may be raised by passing current through a resistor (Rd4) and a diode (Dd4) to the pull down resistor (Rd5) from a suitable source of voltage (Vd3). Conversely, when the lamp voltage detection signal (Sv) is lower than a non-load open circuit voltage, the transistor (Qd1) is turned on, so that the current from the source of voltage (Vd3) is short-circuited and the controlled object signal (Sd5) becomes equivalent to the lamp current detection signal (Si). That is, in the circuit which consists of the pull down resistor (Rd5), the diode (Dd3), and the diode (Dd4), voltage corresponding to one that is not the smaller between an anode side signals (Sd6) and (Sd7) of diodes is selected and is generated in the pull down resistor (Rd5).

Thus, in such a structure, even if the output current almost does not flow so that the lamp current detection signal (Si) is inputted little, when the lamp voltage detection signal (Sv) tries to become higher than the non-load open circuit voltage, the lamp voltage (VL) is always restricted to approximately the non-load open circuit voltage or less in a hardware manner, due to rapid increase of the controlled object signal (Sd5).

The chopper drive target signal (Sd2) is divided by resistors (Rd2) and (Rd3), and is inputted into the inversion input terminal of an operational amplifier (Ade). On the other hand, the controlled object signal (Sd5) is inputted into the non-inversion input terminal of the operational amplifier (Ade). Since the output signal (Sd1) of the operational amplifier (Ade) is fed back to the inversion input terminal thereof through an integrating capacitor (Cd1) and a speedup resistor (Rd6), the operational amplifier (Ade) serves as an error integrating circuit which integrates the difference of the voltage of the controlled object signal (Sd5) and the divided voltage by the resistors (Rd2) and (Rd3) of the chopper drive target signal (Sd2).

Figure 4:
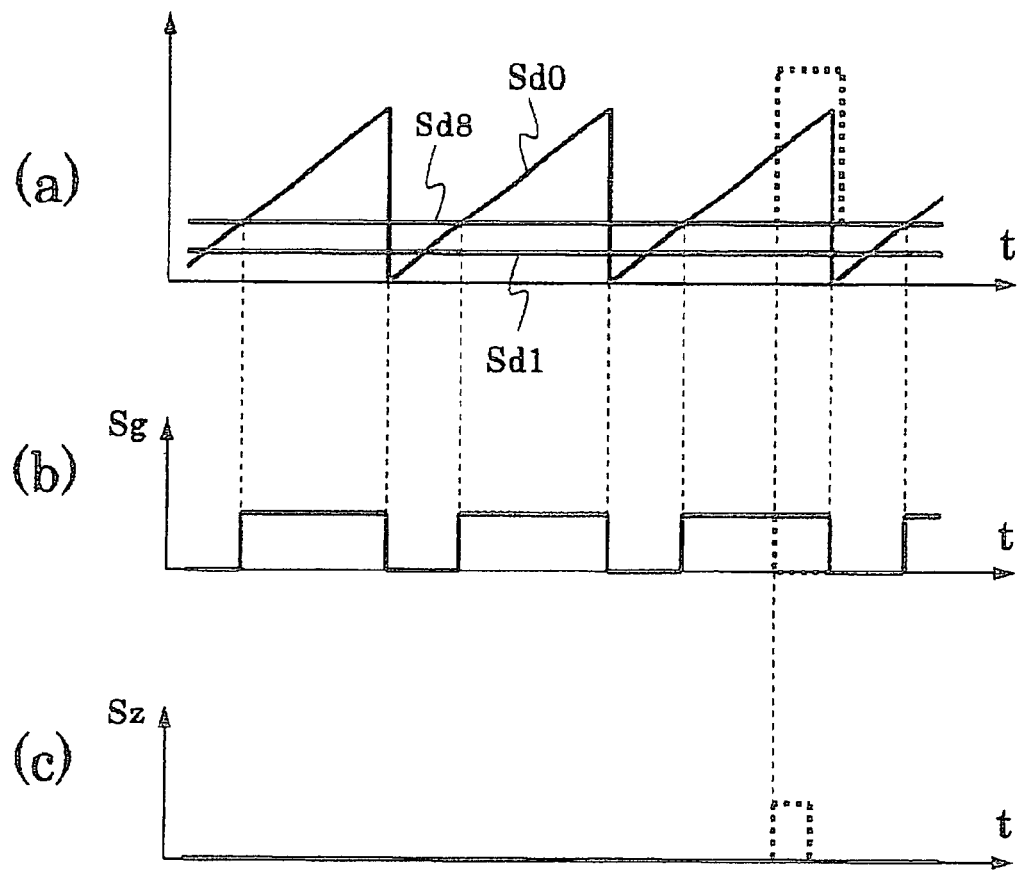
FIG. 4 is a schematic timing chart showing part of an embodiment of a discharge lamp lighting apparatus.

An oscillator (Osc) to which a capacitor (Cd0) and a resistor (Rd0) are connected, generates a saw-tooth waveform signal (Sd0) as shown as (a) in FIG. 4, and the saw-tooth waveform signal. (Sd0) and the output signal (Sd1) of the error integrating circuit are compared by a comparator (Cmg). However, upon the comparison, the signal (Sd8) which is formed by adding offset voltage (Vd4) to the output signal (Sd1) of the error integrating circuit and the saw-tooth waveform signal (Sd0) are compared with each other. A gate driving signal (Sg) which becomes high-level in a period during which the voltage of the saw-tooth waveform signal (Sd0) is higher than the voltage of the signal (Sd8) is generated, and outputted from the electric supply capacity control circuit (Ud).

As described above, since the signal (Sd8) is generated by adding the offset to the output signal (Sd1) of the error integrating circuit, even if the output signal (Sd1) of the error integrating circuit is zero, the duty cycle ratio of the gate driving signal (Sg) is set so as to become a certain maximum value or less, which is smaller than 100%, i.e., the maximum duty cycle ratio Dxmax or less.

In FIG. 4, (a) and (b) show the relation among the output signal (Sd1) of the error integrating circuit, the signal (Sd8) which is formed by adding offset to this signal, the saw-tooth waveform signal (Sd0), and the gate driving signal (Sg).

As shown in FIG. 2, the gate driving signal (Sg) outputted from the electric supply control circuit (Fx) is inputted into the gate driving circuit (Gx), so that the feedback control system by which the lamp current detection signal (Si) and the lamp voltage detection signal (Sv) are fed back to an operation of a switching element (Qx) may be formed. In addition, in the configuration of the electric supply capacity control circuit (Ud) shown in FIG. 3, a commercially available integrated circuit such as TL494 (TEXAS INSTRUMENTS, INC.) etc., in which the operational amplifier (Ade), the oscillator (Osc), the comparator (Cmg), etc. are integrated can be used.

Figure 5:
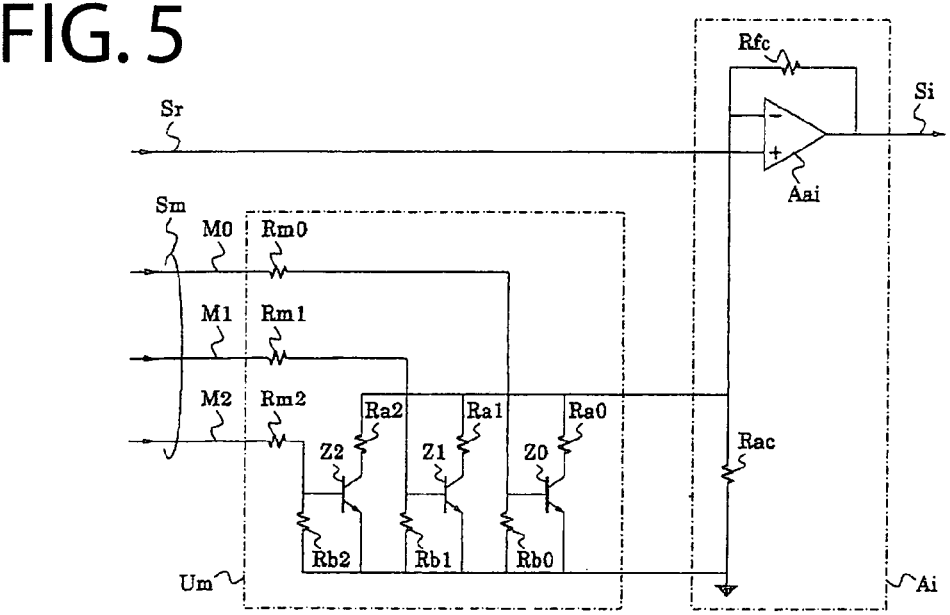
FIG. 5 is a graph showing part of an embodiment of a discharge lamp lighting apparatus.

FIG. 5 shows a schematic view of an example of the structure of the lamp current modulation circuit (Um) and the lamp current detection signal converter (Ai) which are shown in FIG. 3. In this figure, the modulation signal (Sm) is multi-bit digital signal data with the gradation, which consists of modulation signals (M0, M1, M2). In the circuit shown in this figure, the reversed amplifying circuit is mainly made up of an operational amplifier (Aai), wherein the original lamp current detection signal (Sr) is amplified by the operational amplifier (Aai), and the lamp current detection signal (Si) is generated as an output signal therefrom.

Since the output of the operational amplifier (Aai), is divided by combined resistance of resistor (Rfc), a resistor (Rac), and resistors which are in parallel connected to the resistor (Rac) and is inputted to the inverting input terminal of the operational amplifier (Aai), the gain of this reversed amplifying circuit is determined by this voltage division ratio. Since switching elements (Z0, Z1, Z2) (transistors) are provided respectively, between the resistors (Ra0, Ra1, Ra2) connected in parallel to the resistor (Rac) and the ground, and since the resistors (Ra0, Ra1, Ra2) are connected or disconnected, when the switching elements (Z0, Z1, Z2) are turned on or off, respectively, it is possible to change the gain of this non-inversion amplifying circuit.

Since base terminals of the switching elements (Z0, Z1, Z2), are connected to lines of the respective modulation signals (M0, M1, M2) through the respective base resistors (Rm0, Rm1, Rm2), an ON/OFF state of each switching element (Z0, Z1, Z2), is controlled, corresponding to the truth/false of each bit of the modulation signal (M0, M1, M2), so that it is possible to change the gain of the non-inversion amplifying circuit based on combination of the truth and false of each bit of the modulation signal (M0, M1, M2).

In the relations of the resistors (Ra0, Ra1, Ra2), by setting up the resistance of the resistor (Ra0) twice the resistance of resistor (Ra1), and the resistance of the resistor (Ra1) twice the resistance of the resistor (Ra2), it is possible to change the gain of this non-inversion amplifying circuit as binary number data of three bits in which the modulation signal (M0) is set as the least significant bit, and the modulation signal (M2) is set as the most significant bit. However, there are no direct relation between the binary number data and the gain of the non-inversion amplifying circuit. In addition, although an example of bits is described above, the number of bits may be increased if needed.

In the case of the discharge lamp lighting apparatus shown in FIGS. 3 and 5, modulation is carried out as to gain in generation of the lamp current detection signal (Si). Therefore, as this gain is small, the modulation is carried out so that more lamp current may increase. Therefore, of the data values of the modulation signal (Sm), as to the gain of the lamp current detection signal converter (Ai), the data value (SmO) corresponding to a gain in case where modulation is not carried out, is suitably defined beforehand. Immediately after starting of a lamp, generation of the modulation signal (Sm) is restricted, so that the data value, according to which gain becomes smaller than the data value (SmO) corresponding to the non-modulation does not appear. That is, the increase modulation is restricted by controlling the degree at which the gain is made small. And after that, when time passes and cancellation (release) of the restriction (suppression) should be carried out, although the range of the data value of the modulation signal (Sm) which can appear in order to carry out the pulse increase modulation has been restricted so that the data value, according to which the gain may become smaller than the data value (SmO) corresponding to the non-modulation, does not appear, the restriction is eased, gradually, and the modulation signal (Sm) is generated so that the data value of the modulation signal (Sm) corresponding to smaller gain can appear.

In this manner, the discharge lamp lighting apparatus of the embodiment is operated. Since the restricted increase modulation is released gradually, i.e., slowly, as described above, viewers do not notice change of a projection image, or do not think that it is offensive to their eyes. In addition, even if it is before the time when restriction of the increase modulation should be released, as to the data value according to which the gain becomes larger than the data value (SmO) corresponding to the non-modulation, since the modulation is carried out so that lamp current decreases even if it appears, there is no problem about consumption of the lamp electrode due to the lamp current exceeding the maximum value ILmax. However, as described above, from a viewpoint of starting the light flux of a lamp fast, it is more advantageous not to carry out the modulation so that the lamp current decreases.

Figure 6:
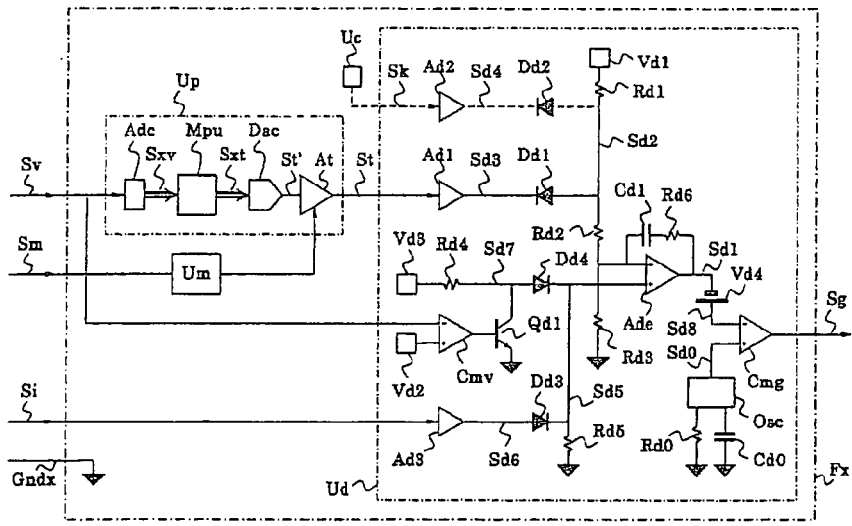
FIG. 6 is a schematic diagram showing part of an embodiment of a discharge lamp lighting apparatus.

Next, one of embodiments is explained, referring to FIG. 6 which is a schematic view of the structure of the electric supply control circuit (Fx). Although FIG. 3 shows the structure in which, the lamp current modulation circuit (Um) is connected to the lamp current detection signal converter (Ai), so as to carry out modulation on the gain thereof, in FIG. 6, a lamp current modulation circuit (Um) is connected to a lamp current target signal converter (At) which is made up of an amplifier or an attenuator provided in the downstream side of a digital-to-analog converter (Dac), and according to modulation signal (Sm), modulation is carried out to the gain of the lamp current target signal converter (At). Thus, the structure in that a lamp current target signal (St) is generated is different from that in FIG.3. An operation in a power supply capacity control circuit (Ud) after this lamp current target signal (St) is generated is the same as that which is explained as to FIG. 3.

Figure 7:
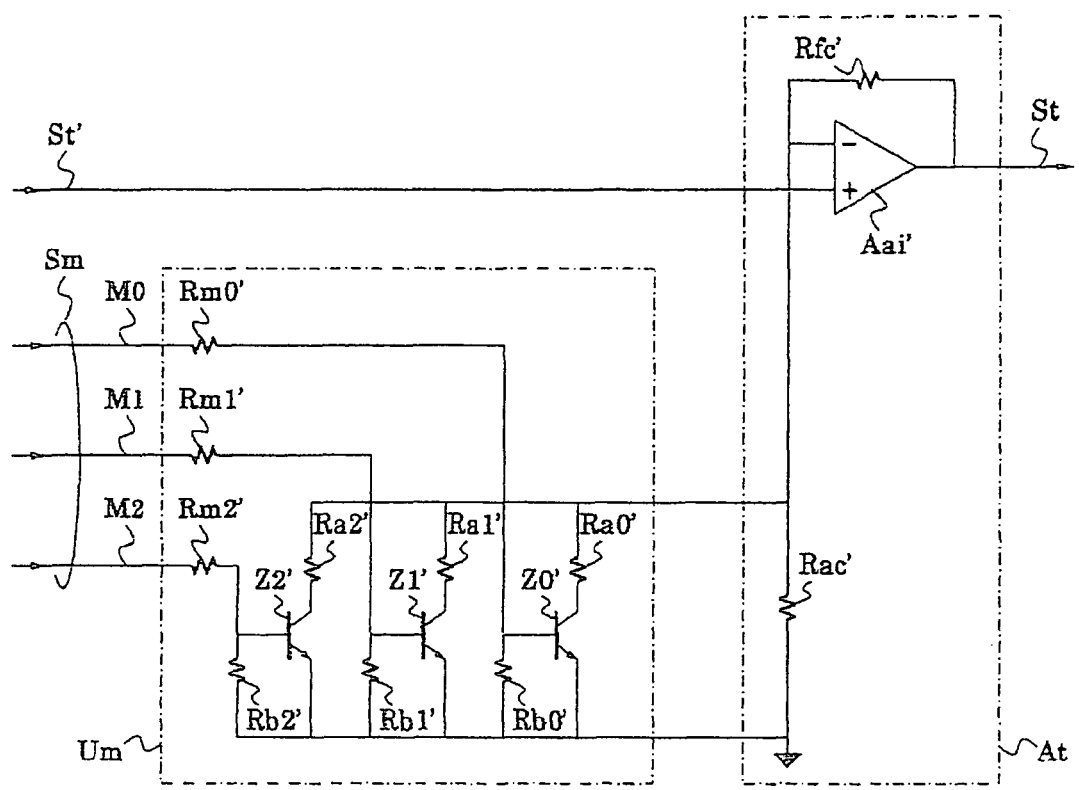
FIG. 7 is a schematic diagram showing part of an embodiment of a discharge lamp lighting apparatus.

FIG. 7 is a schematic view showing an example of the structure of the lamp current modulation circuit (Um) and the lamp current target signal converter (At), which are shown in FIG. 6. Since the structure thereof is similar to that of FIG. 5, they are operated similarly. In the circuit shown in this figure, a reversed amplifying circuit is mainly made up of an operational amplifier (Aai'), in which the lamp current detection signal (St') is amplified by the operational amplifier (Aai'), and a lamp current detection signal (St) is generated as an output signal thereof. The modulation signal (Sm) is multi-bit digital signal data with gradation, which consists of modulation signals (M0, M1, M2).

In the case of the discharge lamp lighting apparatus shown in FIGS. 6 and 7, since modulation can be performed on the gain in the generation of the lamp current target signal (St). Therefore, as this gain is increased, modulation is carried out, so that more lamp current may be increased. Therefore, of the data value of the modulation signal (Sm), as to the gain of the lamp current detection signal converter (Ai), the data value (SmO) corresponding to a gain on which modulation is not carried out, is suitably defined beforehand, and immediately after starting of a lamp, generation of the modulation signal (Sm) is restricted. That is, increase modulation is restricted by controlling the degree at which the gain is made large. And after that, when time passes and release of the restriction should be carried out, although the range of the data value of the modulation signal (Sm) which can appear in order to carry out pulse increase modulation has been restricted so that the data value according to which the gain may become smaller than the data value (SmO) corresponding to the non-modulation does not appear, the restriction is eased, gradually, the modulation signal (Sm) is generated so that the data value of the modulation signal (Sm) corresponding to larger gain, can appear.

The discharge lamp lighting apparatus of the embodiment is operated in this way. Since the controlled increase modulation is canceled (eased) gradually, i.e., slowly, viewers of a projection image do not notice that there is such change, or do not think that it was offensive to their eyes. In addition, even if it is before restriction of increase modulation should be canceled or restricted, as to the data value according to which gain becomes smaller than the data value (SmO) corresponding to the non-modulation, since the modulation is carried out so that lamp current decreases even if it appears, there is no problem about consumption of the lamp electrodes due to the lamp current exceeding the maximum value ILmax. However, as described above, from a viewpoint of starting the light flux of a lamp early, it is more advantageous not to carry out the modulation so that the lamp current decreases.

Next, referring to FIG. 6 which is a schematic view showing the structure of the electric supply control circuit (Fx), one of embodiments is explained. The added circuit is shown with dot-dashed signal line. The lamp current maximum signal (Sk) for defining a maximum value ILmax of the permitted lamp current (IL) is generated by a lamp current maximum signal generating circuit (Uc), so as to be inputted in a power supply capacity control circuit (Ud).

The lamp current maximum signal (Sk) is inputted, through an amplifier or a buffer (Ad2) and a diode (Dd2) which are provided if needed, to one end of a pull-up resistor (Rd1) with the lamp current target signal (St). Further, the chopper driving target signal (Sd2) is one of a signal. Sd3 corresppnding to the output current target signal (St) and a signal (Sd4) corresponding to the lamp current maximum signal (Sk), which has a smaller magnitude. Therefore, as to the lamp current target signal (St) generated by carrying out modulation on the gain of a lamp current target signal converter (At) according to the modulation signal (Sm), the chopper drive target signal (Sd2) is restricted so that lamp current (IL) may not exceed a current value corresponding to the lamp current maximum signal (Sk), i.e., a maximum value ILmax, in the power supply capacity control circuit (Ud).

For this reason, on the condition where the lamp current target signal (St) is set as the value corresponding to the maximum value ILmax of lamp current immediately after start-up because of too low lamp voltage, even if pulse-like increase modulation is carried out by the lamp current modulation circuit (Um) on the lamp current target signal (St), part exceeding the maximum value ILmax is automatically restricted so as not to be clamped and outputted.

Figure 8:
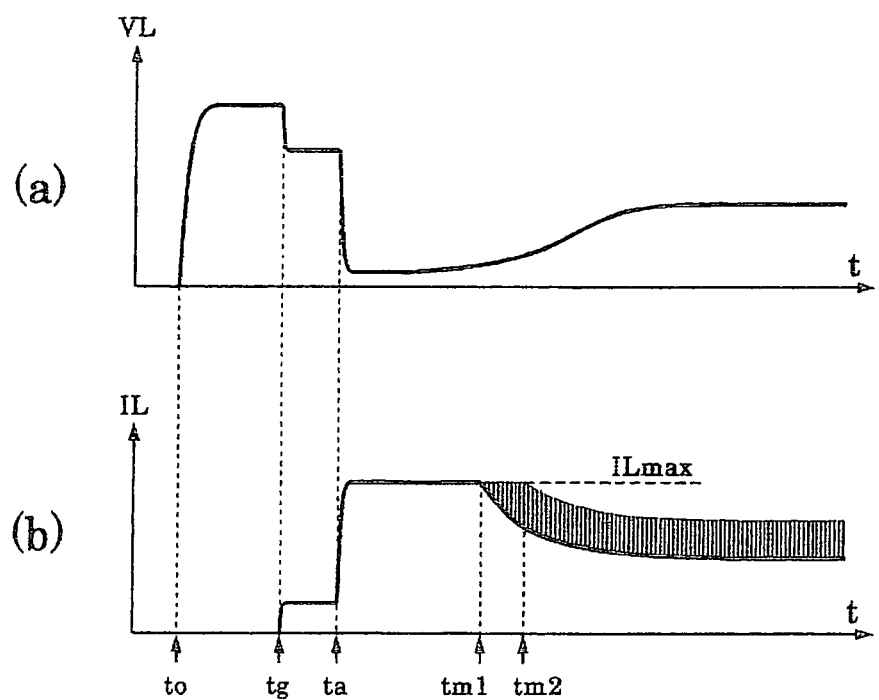
FIG. 8 is a schematic diagram showing an operation of part of an embodiment of a discharge lamp lighting apparatus.

As shown in FIG. 8 in which (a) shows a state of change of the lamp voltage (VL) and (b) shows a state of change of the lamp current (IL) in the discharge lamp lighting apparatus of embodiment, even if the pulse increase modulation is started at a suitable timing after the time (ta) at which the discharge is shifted to arc discharge, lamp current is automatically restricted in a period where the lamp current is restricted to the maximum value Ilmax, so that the pulse superposition to lamp current is not performed. And if lamp voltage goes up and the lamp current becomes less than the maximum value ILmax so that room for pulse superposition is generated, the current pulse of the amount of the margin is automatically superimposed thereon. Since the speed of the fall of the lamp current from the maximum value ILmax along with a lamp voltage rise is slow, the restrictions of the current pulse amplitude to be superimposed are also released gradually, i.e., slowly, over long time from time (tm1) to time (tm2), as shown in FIG. 8, since the controlled increase modulation is released gradually, i.e., slowly, as described above, viewers do not notice change of a projection image, or do not think that it is offensive to their eyes.

Figure 9:
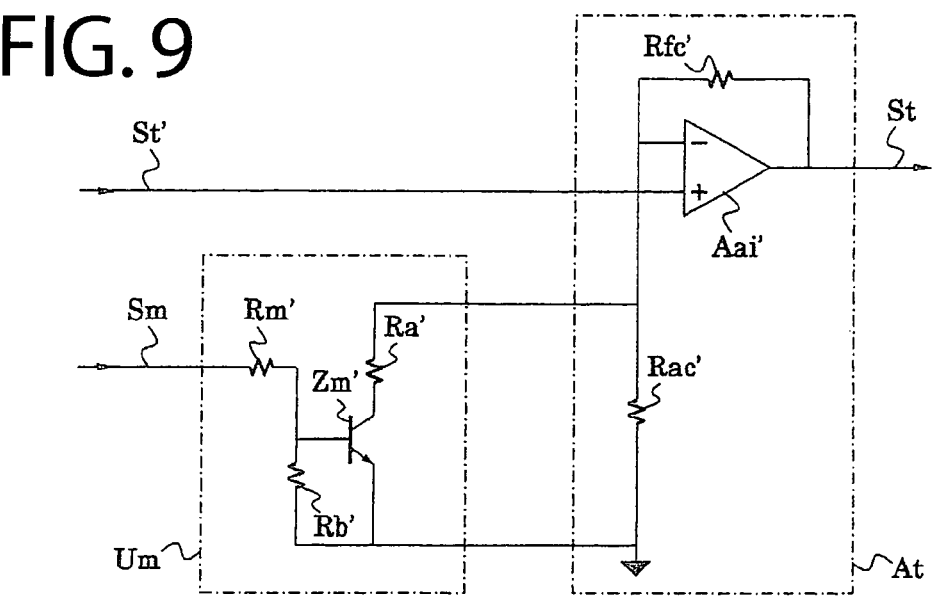
FIG. 9 is a schematic diagram showing part of an embodiment of a discharge lamp lighting apparatus.

In addition, when lamp current (IL) is controlled so as not to exceed the maximum value ILmax in this manner, there is no necessity that the lamp current modulation circuit (Um) or the lamp current target signal converter (At) has the function that restriction of increase modulation is released gradually. For this reason, the lamp current modulation circuit (Um) may be operated with the 1 bit binary modulation signal (Sm) which has high and low levels, as shown in FIG. 9, so that there is an advantage that a circuit is remarkably simplified.

Next, one of embodiments is explained, referring to FIG. 3 which is a schematic view of the structure of the electric supply control circuit (Fx). The added circuit is shown in dashed line. Based on a lamp current detection signal (Sr), when the lamp current (IL) tends to exceed the maximum value ILmax, a chopper stop signal generating circuit (Uz) generates a chopper stop signal (Sz). In addition, the form of the chopper stop signal (Sz) is disclosed, for example, as (c) in FIG. 4.

The generated chopper stop signal (Sz) is inputted into a voltage shift circuit (Vd4). The voltage shift circuit (Vd4) increases the generated offset voltage to the value which exceeds the sawtooth waveform signal (Sd0), when the voltage shift circuit (vd4) receives a chopper stop signal (Sz). By such an operation according to the chopper stop signal generating circuit (Uz) and the voltage shift circuit (Vd4), when the output of the gate driving signal (Sg) is suspended immediately as shown in a dashed line of FIG. 4, that is, by a so-called pulse-by-pulse over-current control function provided to the electric supply control circuit (Fx), increase of lamp (current exceeding the maximum value ILmax can be prevented. In addition, once the chopper stop signal (Sz) is generated, the output suspension state of the gate driving signal (Sg) is held, up to the trailing edge of the saw-tooth waveform signal (Sd0) by a latch operation.

On the condition where the lamp current target signal (St) is set as the value corresponding to the maximum value ILmax of lamp current immediately after start-up because of too low lamp voltage, even if pulse increase modulation is carried out by the lamp current modulation circuit (Um) with respect to the lamp current detection signal (Si), part exceeding the maximum value ILmax is automatically controlled so as not to be clamped and outputted.

Therefore, based on the discharge lamp lighting apparatus of the embodiment, as shown in (a) and (b) of FIG. 8 which schematically show the situation of change of the lamp voltage (VL) and the lamp current (IL) respectively, at a suitable timing after the time (ta) when the state of the discharge is shifted to arc discharge, even if the pulse increase modulation is started, lamp current is automatically restricted in the period where the lamp current is restricted to the maximum value Ilmax, and the pulse superposition to lamp current is not performed. And if the lamp voltage goes up, the lamp current becomes less than the maximum value Ilmax so that pulse superposition can be carried out because of margin (difference between the lamp current and the maximum value Ilmax), the current pulse of the amount of the margin is automatically superimposed thereon. Since the speed of the fall of the lamp current from the maximum value ILmax along with a lamp voltage rise is slow, the restriction to the current pulse amplitude to be superimposed is also released gradually, i.e., slowly, over long time from the time (tm1) to the time (tm2), as shown in FIG. 8, since the controlled increase modulation is released gradually, i.e., slowly, as described above, viewers do not notice change of a projection image, or do not think that it is offensive to their eyes.

Figure 10:
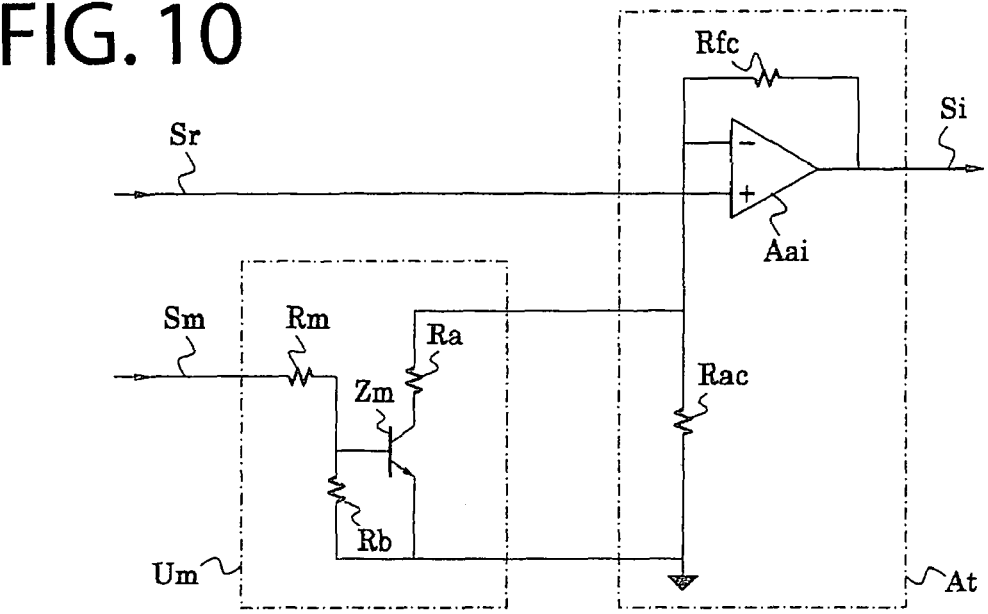
FIG. 10 is a schematic diagram showing part of an embodiment of a discharge lamp lighting apparatus.

In addition, when the lamp current (IL) is controlled so as not to exceed the maximum value ILmax in this manner, there is no necessity that the lamp current modulation circuit (Um) or the lamp current detection signal converter (Ai) has the function that restriction of increase modulation is released gradually. For this reason, the lamp current modulation circuit (Um) may be operated with the 1 bit binary modulation signal (Sm) which has high and low levels, as shown in FIG. 10, so that there is an advantage that a circuit is remarkably simplified.

As an example of the circuit of the lamp current detection signal converter (Ai), or the lamp current target signal converter (At) which can carry out modulation on gain, in FIGS. 5, 7, 9, and 10, a circuit in which an amplification factor of the non-inverting amplifier comprising an operational amplifier is variable, is shown. However, if it is a converter which can carry out modulation on gain, the form of the circuit is not the essence of the present invention. For example, a circuit which is mainly made up of an inverting amplifier, or a circuit in which an amplifier is not used but, for example, divided voltage ratio of dividing resistors is variable, can be used. Moreover, in case of carrying out modulation on gain according to data having gradation which is made up of a multiple bit digital signal, for example, it can also be formed by an IC for a DA conversion or by using a ladder resistor network.

The circuit arrangement, such as the electric supply control circuit (Fx) or the power supply capacity control circuit (Ud) is not limited to those shown in FIGS. 3 and 6, and the suitable structure may be employable according to the feature and the performance of the discharge lamp lighting apparatus of the embodiment.

Figure 11:
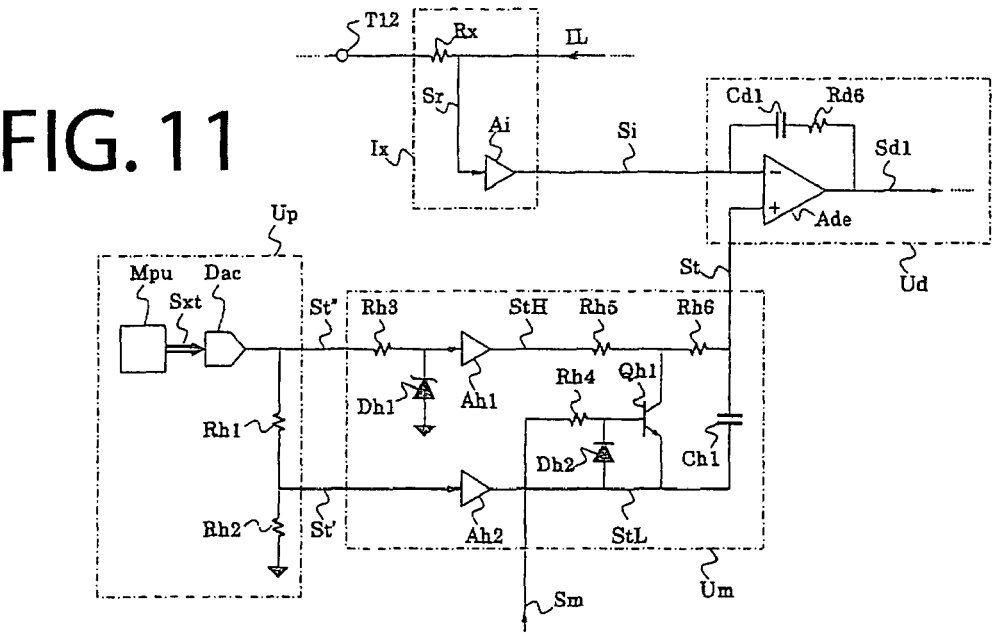
FIG. 11 is a schematic diagram showing part of an embodiment of a discharge lamp lighting apparatus.
Figure 14:
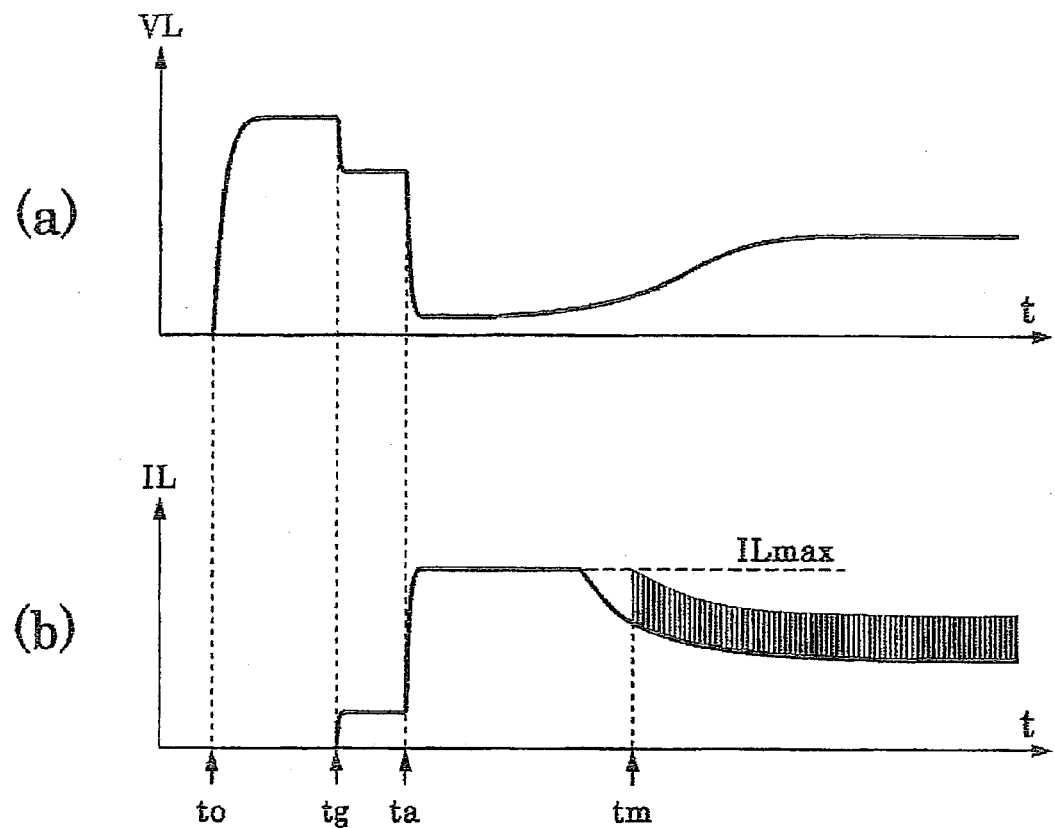
FIG. 14 is a schematic diagram showing an operation of part of an embodiment of a conventional discharge lamp lighting apparatus.

One of the embodiments is explained referring to FIG. 11 which is a partial schematic view showing a structure of an electric supply control circuit (Fx).

An electric power control circuit (Up) generates a lamp current target value at the time when modulation is carried out, that is, a lamp current modulation target signal (St") corresponding to the current value of the peak of a pulse to be superimposed, before being restricted to the maximum value Ilmax. Moreover, according to voltage dividing resistors (Rh1, Rh2), a lamp current target value is generated in case where modulation is not carried out, that is, an original lamp current target signal (St') corresponding to the current value before a pulse is superimposed is generated.

In addition, although it may be easy to understand if it is described that an electric power control circuit (Up) generates an original lamp current target signal (St'), and amplifies this lamp current target signal (St'), so as to generate the lamp current modulation target signal (St"). When the modulation signal (Sm) is a binary signal which is made up of at least 1 bit, as shown in FIG. 11, if a lamp current modulation target signal (St") is generated first, and the lamp current target signal (St') is generated after that, rather than using an amplifying circuit, the structure of the circuit arrangement is simple and practical. However, when the modulation signal (Sm) is data with gradation made up of a multiple bit digital signal, or in the case where the modulation signal (Sm) is made up of a multi-bit digital signal or an analog signal component defining the rate at which lamp current is increased by the increase modulation, and a 1-bit binary signal component which determines whether or modulation is carried out thereon, the structure is configured so that the original lamp current target signal (St') is generated firsts and the lamp current modulation target signal (St") is generated after that, using an amplifying circuit etc. if needed.

Since it is assured that the lamp current modulation target signal (St") of the two generated signals, becomes the value which does not exceed the maximum value ILmax of the lamp current (IL) capable of permitting the target value, a voltage restriction function performed by a resistor (Rh3) and a zener diode (Dh1) which has zener voltage corresponding to the maximum value ILmax is provided thereto. In addition, as the voltage restriction by this zener diode (Dh1), as in a portion extending from the lamp current maximum signal generating circuit (Uc) to the diode (Dd2) shown in FIG. 6, a clamping circuit using a suitable voltage source and a diode may be used.

The lamp current modulation target signal on which the voltage restriction has been carried out, through a buffer (Ah1) provided if needed, is converted to a lamp current modulation upper-bound signal (StH) corresponding to the current value of the pulse peak to be superimposed, which is restricted to the maximum value Ilmax, and outputted therefrom. On the other hand, the original lamp current target signal (St') is converted to a lamp current modulation lower-bound signal (StL) corresponding to the current value prior to a pulse superimposion, through a buffer (Ah2) provided if needed, and outputted therefrom.

The binary modulation signal (Sm) is inputted to the base of a transistor (Qh1) through a resistor (Rh4), so that the transistor (Qh1) is switched to an ON or an OFF state. In addition, in order to prevent a reverse bias of the base of the transistor (Qh1), a diode (Dh2) is provided if needed. When the modulation signal (Sm) is high level, the transistor (Qh1) is ON, so that the lamp current modulation lower-bound signal (StL) is selected, and when the modulation signal (Sm) is low level, the transistor (Qh1) is OFF, so that the lamp current modulation upper-bound signal (StH) is selected through a resistor (Rh5). Therefore, in the collector of the transistor (Qh1), potential appears at a period in which the pulse of increase modulation is not superimposed, and in a period in which pulse is superimposed respectively, and, it is inputted into the non-inverting input terminal of an operational amplifier (Ade) as a lamp current target signal (St) through a resistor (Rh6).

On the other hand, the lamp current detection signal (Si) generated in a lamp current detector (Ix) is inputted into the inverting input terminal of the operational amplifier (Ade). Since the output signal of the operational amplifier (Ade) is fed back to the inverting input terminal through an integrating capacitor (Cd1) and a speedup resistor (Rd6), the operational amplifier (Ade) works as an error integrating circuit which integrates the difference between the lamp current detection signal (Si) and the lamp current target signal (St) ((St)-(Si)), and generates an error output signal (Sd1). The operation after this error output signal (Sd1) is generated is the same as that which is explained above with respect to the electric supply control circuit (Fx) in FIG. 3. At time of the leading edge etc., of a pulse which is superposed by increase modulation in case that overshoot occurs in lamp current waveform, a CR time constant formed by a capacitor (Ch1) and resistors (Rh5, Rh6) is given, by adding the capacitor (Ch1) having suitable capacitance, so that the change speed of the lamp current target signal (St) is adjusted, and the amount of overshoot can be reduced.

The feature of an electric supply control circuit (Fx) disclosed in FIG. 11, is that in a control operation in which the lamp current (IL) may not exceed a predetermined value, neither does it restrict the lamp current target signal (St) when it tends to exceed a predetermined value, nor does it restrict the lamp current detection signal (Si) which tends to exceed a predetermined value. However, a signal corresponding to the lamp current value in a period when the increase modulation is not carried out beforehand, and a signal corresponding to the lamp current value in a period when the increase modulation in which it is assured not to exceed a predetermined value, is carried out, are generated beforehand, and one of the signals is selected. It is based on the system which generates signals for determining the level of the lamp current in the period when the increase modulation is not carried out, and the period when increase modulation is carried out.

When the former signal tends to exceed a predetermined value, for example, when change speed is adjusted by providing CR time constant to the signal in a system restricted by a clamping circuit, the signal waveform at time when the restriction is carried out and that at time when the restriction is not carried out (since a clamp operation occurs suddenly in the middle of the leading edge of the signal when restriction occurs) are no longer similarity shape, so that there is a drawback that the situation of overshoot generation changes somewhat. On the other hand, in the latter case, when CR time constant is provided to the signal chosen from these two signals which have been generated beforehand so that change speed is adjusted, there is no difference in operation at the time the restriction is carried out and at the time of restriction is not carried out. Therefore the similarity shape of the signal waveforms is maintained, and there is an advantage that occurrence of the overshoot is proportional, and a situation does not change.

In addition, the same transistor switch as the transistor (Qh1) is formed instead of the zener diode (Dh1). The collector and emitter of this transistor switch are connected to the output side edge of the resistor (Rh3), and the lamp current modulation lower-bound signal (StL), respectively. Furthermore, a capacitor is connected in parallel with the collector and emitter of this transistor switch. By switching this transistor to an OFF state from an ON state, it is possible to form a discharge lamp lighting apparatus in which restriction of increase modulation is gradually released according to CR time constant of the capacitor and the resistor (Rh3).

Next, one of embodiments is explained referring to FIG. 12 which is a schematic view of the structure of the discharge lamp lighting apparatus according to the embodiment.

This figure shows an alternating current driving type discharge lamp lighting apparatus in which a full bridge type inverter (Ui) in the downstream side of a power supply circuit (Ux) is provided. The inverter (Ui) comprises a full bridge circuit which is made up of switching elements (Q1, Q2, Q3, Q4), such as FETs.

Each switching element (Q1, Q2, Q3, Q4) is driven by a-gate driving circuit (G1, G2, G3, G4). In the gate driving circuits (G1, G2, G3, G4), when a pair of diagonal elements, such as, the switching elements (Q1) and (Q3) are in the ON state, and the other pair of diagonal elements, that is, the switching elements (Q2) and (Q4) are maintained in an OFF state. Conversely when the other pair of diagonal elements switching elements (Q2) and (Q4) is in an ON state, the pair of diagonal elements (Q1) and (Q3) is maintained in the OFF state. When switching the two phases, a dead time, that is, a period in which all the switching elements (Q1, Q2, Q3, Q4) are in an Off state, is inserted.

In case that each of the switching elements (Q1, Q2, Q3, Q4) is formed of a MOSFET, a parasitism diode (not shown) whose forward direction is from a source terminal to a drain terminal is built in each of the elements. However, in case that they are, for example, elements such as bipolar transistors, which do not have any parasitism diode, there is a possibility that these elements may be damaged due to generation of a reverse voltage, when induced current which attributes to an inductance component which exists in a downstream side of the inverter (Ui), flows at the time of the above mentioned phase switching period or the dead time. It is desirable to connect a diode which is equivalent to the parasitism diode in reverse-parallel thereto, since these elements may be damaged due to generation of reverse voltage.

In addition, this figure shows the discharge lamp lighting apparatus which has the trigger circuit of the external trigger system. In a trigger drive circuit (Us1), a capacitor (Ce) is charged with output voltage of the power supply circuit (Ux) through a resistor (Re). For example, if a gate driving circuit (Ge) is activated in response to a trigger signal (not shown) generated by a microprocessor unit (Mpu) etc., the switching element (Qe) which consists of a thyristor etc. becomes conductive, so that a capacitor (Ce) discharges electricity through a primary side coil (Pe) of a high-voltage transformer (Te). The high voltage generated in the secondary side coil (He) is impressed to an auxiliary electrode (Et) of the discharge lamp (Ld), thereby initiating electric discharge between the electrodes (E1, E2) of the discharge lamp (Ld).

Moreover, when a high-voltage transformer (Te) operates, a transformer (Th) for reinforcing a no-load open circuit voltage impressed to the electrodes (E1, E2) for main electric discharge is added, so as to improve the lighting nature of the discharge lamp (Ld). A capacitor (Ch) is added to a trigger drive circuit (Us1), so as to be connected to a connection node of a resistor (Re) and a switching element (Qe) with a capacitor (Ce), so that the capacitor (Ch) may be charged through the primary side coil (Ph) of the transformer (Th). Therefore, when pulse current flows through the primary side coil (Pe) of the high-voltage transformer (Te) so that a high-voltage pulse is impressed to the auxiliary electrode (Et), similarly, pulse current flows through the primary side coil (Ph) of the transformer (Th), so that voltage is generated in the secondary side coil (Sh), and the no-load open circuit voltage impressed to the electrodes (E1, E2) from a power supply circuit (Ux) is superposed thereon. Consequently, the lighting nature of a discharge lamp (Ld) is improved.

In the discharge lamp lighting apparatus of an alternating current driving method, if a lamp voltage detector (Vx) and a lamp current detector (Ix) are provided in the upstream side of the inverter (Ui), as shown in FIG. 12, it is suitable that a lamp voltage detection signal (Sv) and a lamp current detection signal (Si) be acquired as signals corresponding to the absolute values of lamp voltage and lamp current, respectively.

FIG. 13 is a schematic block diagram showing an embodiment of a projector according to the embodiment. Light flux (Ox1) emitted from the discharge lamp (Ld) to be initiated and turned on by the discharge lamp lighting apparatus (Ex) of the embodiments, is converted into color sequential light flux (Ox2) by a dynamic color filter (Of), such as a rotation color wheel, through light flux (Ox1') which is passed through a condenser optical system (Oc) including a concave mirror, a condenser lens, etc. provided if needed. The color sequential light flux (Ox2) is modulated by a space modulation element (Om) which comprises a DMD (Trademark), a LCD, or a LCOS (reflected type liquid-crystal-display panel) etc. and outputted as color sequential image light flux (Ox3), and a projection image is formed on a screen (Os) which is provided outside the projector, or which is integrally provided in the projector, by a projection lens (Op).

The image processing unit (Ox) of the projector generates a signal (Soc) corresponding to the appearing color information of the dynamic color filters (Of) based on a pulse count value from a sensor such as a rotary encoder, or an initial detection of the rotational angle and a time passage count value etc., and based on the signal (Soc), generates a modulation switching timing signal (So) so as to transmit it to the discharge lamp lighting apparatus (Ex). And the modulation signal (Sm) is generated in the discharge lamp lighting apparatus, based on the modulation switching timing signal (So). As described above, the modulation signal (Sm) may be generated by an image processing circuit of the main body of the projector.

Moreover, as described above, the discharge lamp lighting apparatus may be either an alternating current drive type or a direct-current drive type. In the case of the alternating current drive type discharge lamp lighting apparatus, when generating an inverter control signal (Sf1, Sf2) which defines polarity-inversion timing of the inverter (Ui), it may be generated in synchronizing with the modulation switching timing signal (So), or it may be generated asynchronously indifferently to the modulation switching timing signal (So).

In addition, in case of the alternating current driving type discharge lamp lighting apparatus with which the external trigger system shown in FIG. 12 is used together, it is easy to control, the sum total of an inductance component along the path of the main discharge current of the discharge lamp (Ld) in the downstream side from the inverter (Ui), to be small. Since it is easy to avoid the problem that the instantaneous light-out at the time of the polarity reversals (inversions) described above, or overshoot, etc. occurs thereby exerting an influence on a display image, it is suitable in the projector in which the polarity-inversion timing of the inverter (Ui) is asynchronous to the modulation switching timing signal (So).

An inductance of the downstream side of the inverter (Ui) is set forth below. In the case where it was used as a light source of a DLP type projector, in order to examine the maximum value of an inductance which does not cause any practical problem in the secondary side coil (Sh), the discharge lamp lighting apparatus in which the discharge lamp (Ld) of 135 W and a coil which had various inductances were inserted in the downstream side of an inverter was actually disposed in a projector. According to the experiment in which display quality of image was observed and evaluated on condition in which the polarity-reversal timing of the inverter (Ui) was asynchronous to the modulation switching timing signal (So). In the case of the front projection type DLP projector for presentations, when the insertion inductance was 80 µH or less, it was confirmed that there was no practical problem. Moreover, if the polarity-reversal timing of the inverter (Ui) was in synchronization with the modulation switching timing signal (So), even if the insertion inductance was further increased, when it was 170 µH or less, it was confirmed that there was no practical problem.

However, in case of a DLP projector for a rear projection type television, since demand for halftone image quality is severe, it is desirable that the polarity-reversal timing of the inverter (Ui) be synchronized with the modulation switching timing signal (So), or it is desirable to set an insertion inductance to 55 µH or less. Even when the polarity-reversal timing of the inverter (Ui) is synchronized with the modulation switching timing signal (So) at the time of this use, it is desirable that the insertion inductance is set to 120 µH or less.

In addition, in a projector which does not have a dynamic color filters (Of); such as the rotation color wheel, for example, a projector which separates the three primary colors of red, green, and blue, i.e., R, G, and B, by a dichroic prism etc., and generates an image according to the respective three primary colors by the space modulation element provided for each color, optical paths are thereof recombined by a dichroic prism etc., so as to display a color image. For example, the modulation signal (Sm) is generated in synchronization with the end timing of a transition period in a switching operation of the space modulation state of the space modulation element. By carrying out the increase modulation of lamp current, it is possible to effectively use technology of improving the influence of the slow operation of the space modulation change in a display of a motion picture.

In this specification, the circuit structures are described at minimum, in order to explain the operations and the functions of the light source apparatuses according to the embodiments Therefore, details of the circuit structures or the operations are determined at time of the design thereof. That is, for example, determinations of the polarity of signals, or originality and creativity, such as selections, additions, or omissions of concrete circuit elements, convenience of procurements of elements, or changes based on economic reasons are premised on being carried out at the time of the design of actual apparatus.

The mechanism for especially protecting circuit elements, such as switching elements (for example, FET) of a power supply apparatus, from breakage factors, such as an overvoltage, and over-current, or overheating, or the mechanism for reducing a radiation noise or a conduction noise, generated with an operation of the circuit element of the power supply apparatus or preventing the generated noise from releasing to the outside, for example, a snubber circuit, and a varistor, a clamp diode, a current restriction circuit (including a pulse by pulse system), a noise filter choke coil of a common mode, or normal mode, a noise filter capacitor, etc. are premised on being added to each part of circuit arrangement shown in the embodiments if needed. The structure of the discharge lamp lighting apparatus is not limited to the circuits disclosed in this specification, or nor waveforms or timing charts described herein. Furthermore, for example, the electric power control circuit (Up) of the electric supply control circuit (Fx) shown in FIG. 1, carries out.

AD conversion of the lamp voltage detection signal (Sv) corresponding to the lamp voltage (VL) is carried out, and based on this, the lamp current target signal (St) is set up. However, the AD conversion of the lamp current detection signal (Si) corresponding to the lamp current (IL) may be also carried out, and then the lamp current target signal (St) is compensated so that the acquired current value may be in agreement with a target current value. Even with diversification of a light source apparatus according to highly precise compensation of, for example, influence of variation of parameter of each circuit element, or high performance, or, conversely, for example, simplification of the structure by not using the microprocessor unit (Mpu) so as to replace it with a simpler control circuit, etc., the light source device according to the present invention can also exhibit the effects of the invention.

The preceding description has been presented only to illustrate and describe exemplary embodiments of the discharge lamp lighting apparatus and a projector according to the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus, comprising:
    a power supply circuit that supplies power to a discharge lamp;
    a lamp voltage detection circuit that detects lamp voltage of the discharge lamp so as to output a lamp voltage detection signal;
    a lamp current detection circuit that detects lamp current of the discharge lamp so as to output a lamp current detection signal;
    an electric power control circuit that updates a lamp current detection signal so that, according to the lamp voltage detection signal, a value of a load electric power value (PL) which is applied to the discharge lamp agrees with that of a predetermined target electric power value (PT);
    an electric power supply capacity control circuit that controls the power supply circuit in a feed back manner so that a difference between the lamp current detection signal and the lamp current target signal becomes small;
    a lamp current modulation circuit which is used for carrying out increase modulation on lamp current with a pulse according to a modulation signal,
    wherein at a start-up of the discharge lamp or immediately thereafter, the increase modulation is restrained, and in a lighting steady state of the discharge lamp, the restraining of the increase modulation is released, and
    wherein when the restraining of the increase modulation is released, in a transition period from immediately after the start-up of the discharge lamp to the lighting steady state, the restraining of increase modulation is gradually released.

2. The discharge lamp lighting apparatus, according to claim 1, wherein, according to the modulation signal, the lamp current modulation circuit carries out the increase modulation on a gain of the lamp current detection signal to an output in the lamp current detection circuit.

3. The discharge lamp lighting apparatus, according to claim 2, wherein the increase modulation is carried out by restraining a degree at which the gain is made small.

4. The discharge lamp lighting apparatus according to claim 1, wherein, according to the modulation signal, the lamp current modulation circuit carries out the increase modulation on a gain of the lamp current target signal to an output in the electric power control circuit.

5. The discharge lamp lighting apparatus, according to claim 4, wherein the increase modulation is carried out by restraining a degree at which the gain is made large.

6. The discharge lamp lighting apparatus, according to claim 1, wherein the increase modulation is restrained by controlling the lamp current so as not to exceed a predetermined value.

7. The discharge lamp lighting apparatus, according to claim 6, wherein a first signal corresponding to a lamp current value when the increase modulation is not carried out and a second signal corresponding to the lamp current when the increase modulation in which the second signal is assured so as not to exceed a predetermined value is carried out, are generated, and one of the first and second signals is selected so that a level of the lamp current in case the increase modulation is not carried out and that of the lamp current in case the increase modulation is carried out, are determined.

8. A projector in which a display image is projected by using light flux which is generated by the discharge lamp, wherein the discharge lamp is started up by the discharge lamp lighting apparatus according to claim 1.

9. A projector according to claim 8, wherein the light from the discharge lamp is converted to color sequential light flux, and the image is projected so as to display by using the color sequential light flux, and the modulation signal is generated depending on a particular color of the color sequential light flax.

* * * * *